US006662064B2

(12) United States Patent
Vollmar et al.

(10) Patent No.: US 6,662,064 B2
(45) Date of Patent: Dec. 9, 2003

(54) METHOD, DATA PROCESSING DEVICE, AND SYSTEM FOR ADAPTIVE CONTROL OF COMPLEX PRODUCTION CHAINS

(75) Inventors: Gerhard Vollmar, Meckenheim (DE); Raiko Milanovic, Heidelberg (DE)

(73) Assignee: ABB Research Ltd., Zuerich (CH)

(*) Notice: Subject to any disclaimer, the term of this patent is extended or adjusted under 35 U.S.C. 154(b) by 0 days.

(21) Appl. No.: 10/262,147

(22) Filed: Oct. 1, 2002

(65) Prior Publication Data

US 2003/0065416 A1 Apr. 3, 2003

Related U.S. Application Data

(63) Continuation of application No. PCT/EP00/02928, filed on Apr. 1, 2000.

(51) Int. Cl.[7] .............................................. G06F 19/00
(52) U.S. Cl. ......................... 700/100; 700/99; 700/108
(58) Field of Search .......................... 700/99, 100, 101, 700/102, 108, 111; 702/179–182; 705/7–9

(56) References Cited

U.S. PATENT DOCUMENTS

| 5,229,948 A | | 7/1993 | Wei et al. | |
| 5,260,868 A | | 11/1993 | Gupta et al. | |
| 5,696,689 A | * | 12/1997 | Okumura et al. | 700/121 |
| 5,737,228 A | * | 4/1998 | Ishizuka et al. | 700/102 |
| 5,751,580 A | * | 5/1998 | Chi | 700/100 |
| 5,993,041 A | | 11/1999 | Toba | |

OTHER PUBLICATIONS

Chen, F. F. et al.: "Analytical Modeling and Analysis of Flexible Manufacturing Systems Considering System Component Failure/Repair Rates", Journal of Manufacturing Systems, vol. 15, No. 3, 1996, pp. 143–154.

* cited by examiner

Primary Examiner—Leo Picard
Assistant Examiner—W. Russell Swindell
(74) Attorney, Agent, or Firm—Laurence A. Greenberg; Werner H. Stemer; Ralph E. Locher (57) ABSTRACT

A method, a device, and a corresponding system for controlling a discrete production process produce or process in a number of production steps. Each step uses a machine, so that different intermediate products are produced. Buffer times are defined and taken into account during which one machine is able to continue to operate for the duration of the failure of one of the machines of a preceding production step by processing a stock of intermediate products corresponding to the associated buffer time and stored in a buffer during the production. In this case, production data are acquired continuously for each machine and, with access to these production data, statistically averaged repair times $MTTR_i$ (Mean Time to Repair) are calculated cyclically by using a MTTR calculator. Based on these times $MTTR_i$, buffer times are calculated by using a $T_P$ calculator and are fed to a device for controlling the production process as desired values for buffer times.

3 Claims, 5 Drawing Sheets

| Time | Machine | Fault event | Duration |
|---|---|---|---|
| 01/01/1999 05:10:45 | Machine 2 | Oil pump off | 00:50:30 |
| 01/01/1999 21:20:05 | Machine 1 | No bottles | 00:30:00 |
| 03/01/1999 20:20:25 | Machine 3 | No bottles | 01:04:30 |
| 03/01/1999 22:05:05 | Machine 2 | Oil pump off | 02:05:00 |
| 03/01/1999 22:20:55 | Machine 3 | Motor off | 01:06:15 |
| 05/01/1999 00:20:10 | Machine 2 | Poor material | 00:45:10 |
| 05/01/1999 12:00:05 | Machine 2 | Maintenance | 00:10:00 |

Fig. 4

$$\text{Costs} = \sum \text{Machine costs} + \sum \text{buffer costs}$$

$$\text{Costs} = \sum \text{Machine costs} + \sum T_{Pi} * K_{Pi}$$

$$\text{Unit costs} = \frac{1}{N \text{ units}} \sum \text{Machine costs} + \sum T_{Pi} * K_{Pi}$$

Fig. 5

METHOD, DATA PROCESSING DEVICE, AND SYSTEM FOR ADAPTIVE CONTROL OF COMPLEX PRODUCTION CHAINS

This application is a continuation of PCT/EP00/02928 filed Apr. 1, 2000.

BACKGROUND OF THE INVENTION

Field of the Invention

The invention relates to a method and a device for the adaptive control of complex production chains, and to a system for implementing such a method.

In many branches of industry, the production process is subdivided into different production lines, also called production chains. A production chain is the series connection of a number of production machines. Between the machines there are so-called buffers, with which different process speeds of the production machines and short stoppages can be compensated for.

The essential characteristic variable of a buffer is the buffer time, that is to say a time during which a supply of intermediate products is produced, with which a stoppage of a machine can be bridged without the production line coming to a standstill. There are guidelines from the manufacturer of the production plant for defining the respective buffer time.

A desired buffer time set in accordance with such predefinitions does not in any way have to be the optimum buffer time, however, particularly with regard to the production costs, which are influenced to quite a significant extent by production losses. The optimum buffer time compensates for faults in the respectively preceding machine, so that there is no loss of production. Optimum buffer times cannot be achieved with fixed time predefinitions, since influences such as machine age or quality of the material processed are not taken into account.

SUMMARY OF THE INVENTION

It is accordingly an object of the invention to provide a method, a data processing device, and a system for adaptive control of complex production chains that overcome the hereinafore-mentioned disadvantages of the heretofore-known methods, devices, and systems of this general type and that adaptively control a production chain by automatically optimizing the desired buffer times of production chains.

With the foregoing and other objects in view, there is provided, in accordance with the invention, a method of controlling a discrete production process. Such discrete production processes typically utilize a series of production steps to process a product. Each of the steps use a respective machine to produce a respective intermediate product. Respective buffer times are defined for each step. Each of the buffer times has a long enough duration that at least one of the number of machines is able to continue to operate throughout a failure of one of the machines of a preceding production step by processing a stock of intermediate products. The previous intermediate products are stored in a buffer during production in case of a failure of a previous machine. The first step of the method is acquiring production data for each machine. The next step is cyclically calculating statistically averaged repair times with an MTTR calculator from the production data. The next step is calculating desired buffer times with a $T_P$ calculator from the statistically averaged repair times. The next step is feeding the desired buffer times to a device for controlling the production process.

With the objects of the invention in view, there is also provided a data processing device working in conjunction with a production system for processing products. The production system includes a desired-value memory and a series of production stations. Each of the production stations have a respective machine performing a respective step to produce a respective intermediate product and have a respective buffer time stored in the desired-value memory. At least one of the machines can continue to operate throughout a failure of one of the machines of a preceding production step by processing a stock of intermediate products corresponding to the associated buffer time and stored in a buffer. The data processing device automatically optimizes the buffer times and includes a data server, a production database, an MTTR database, a production data acquisition device, an MTTR calculator, and a $T_P$ calculator. The data server stores data including production data and fault event data. The production data acquisition device can access the data in the data server, has a data input for receiving additional fault event data, registers stoppage times of the machines, and stores the stoppage times of the machines in the production database. The MTTR calculator accesses the production database, calculates MTTR characteristic values from the stoppage times, and stores the MTTR characteristic values in the MTTR database. The $T_P$ calculator accesses the MTTR database, calculates the buffer times from the MTTR characteristic values using an assessment model, and stores the buffer times in the desired-value memory.

With the objects of the invention in view, there is also provided a production system which combines the production system described above with the data processing device described above.

By using the invention in a production chain, automated optimization of the buffer times is achieved during its entire life cycle.

Other features which are considered as characteristic for the invention are set forth in the appended claims.

Although the invention is illustrated and described herein as embodied in a method, a data processing device, and a system for adaptive control of complex production chains, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
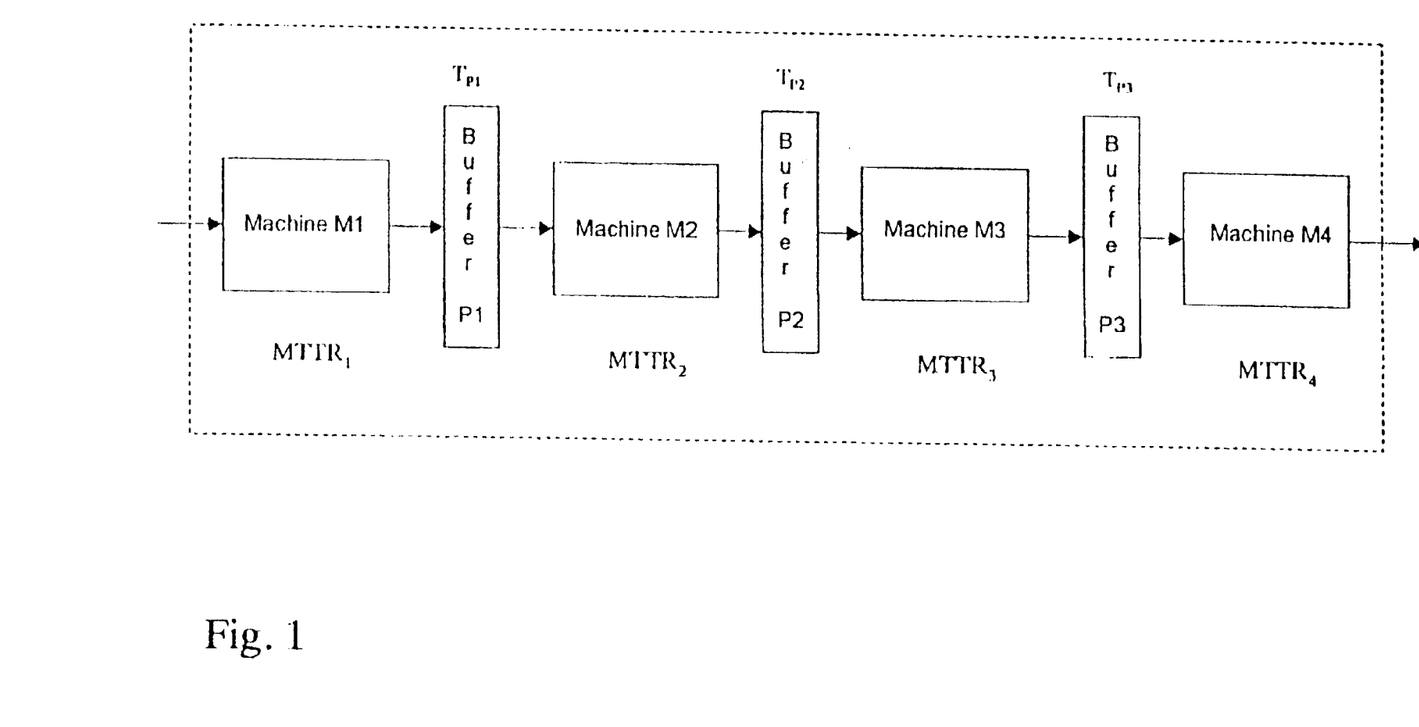
FIG. 1 is a block diagram showing a production chain.

Referring now to the figures of the drawings in detail and first, particularly to FIG. 1 thereof, there is shown schematically the construction of a production chain. The production process in FIG. 1 is directed to one side and begins with a machine M1. Between the machines M1 to M4, in each case buffers P1 to P3 are set up to store intermediate products. The critical characteristic variable of a buffer is the buffer time $T_P$ which can be bridged by processing an intermediate product supply during a machine stoppage. Each machine is allocated a characteristic variable MTTR (Mean Time to Repair). This measure indicates a statistically averaged repair time.

Figure 2:
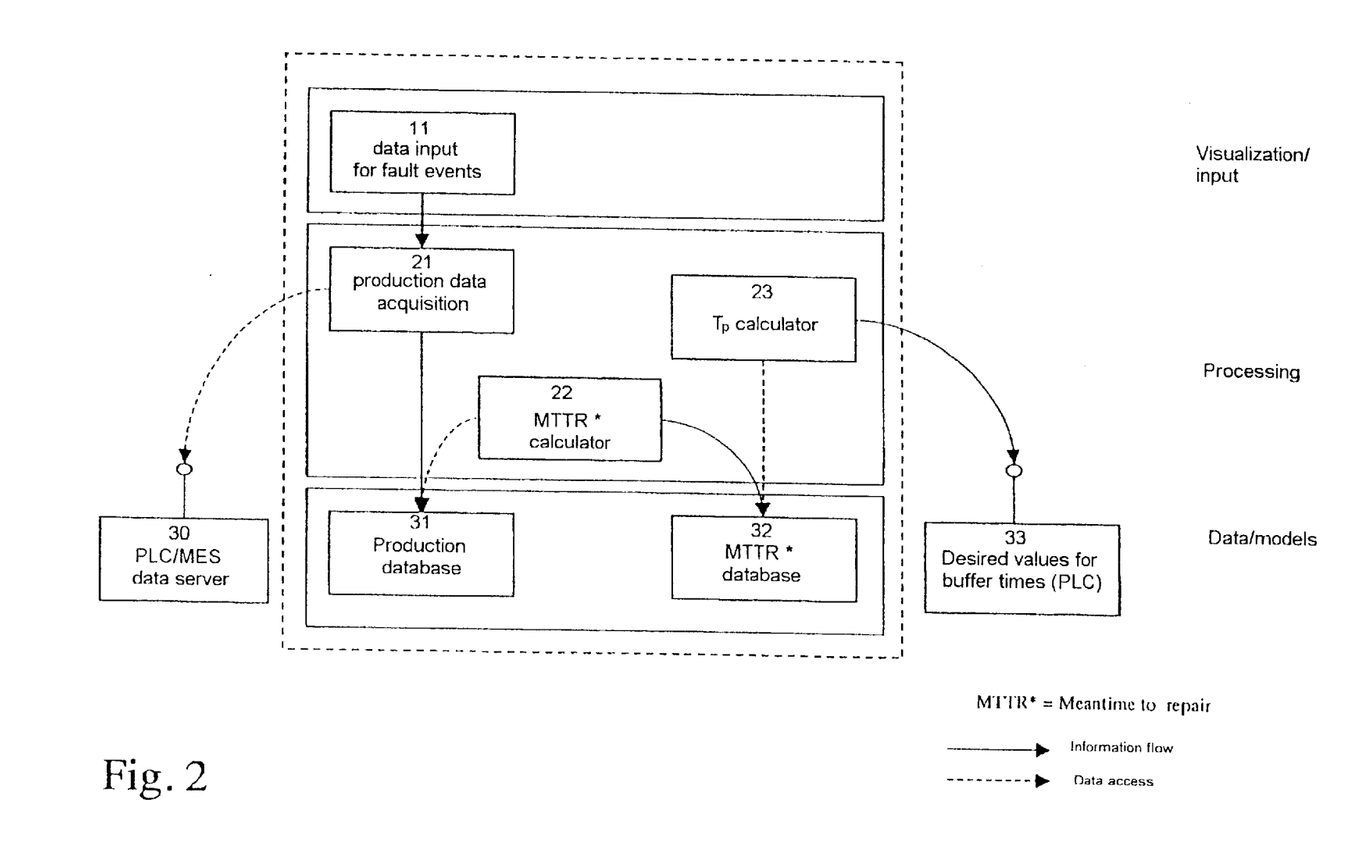
FIG. 2 is a block diagram showing a system for automatically determining optimum buffer times according to the invention.

FIG. 2 shows a system for the automated determination of optimum buffer times $T_{Pi}$ which are stored as desired values in a desired-value memory 33 of a programmable logic controller (PLC).

In this system, a data processing device contains a production data acquisition device 21, which has access to a data server 30 in which production data are recorded, and into which additional fault event data can be entered by using a data input 11. The production data acquisition device 21 is set up to register machine stoppage times and store them as time series in a production database 31. An MTTR calculator 22 has access to the production database 31, and stores calculated MTTR characteristic values in an MTTR database 32. A $T_P$ calculator 23 also contained in the data processing device has access to the MTTR database 32 and stores buffer times $T_{Pi}$ calculated by it in the desired-value memory 33.

Figure 3:
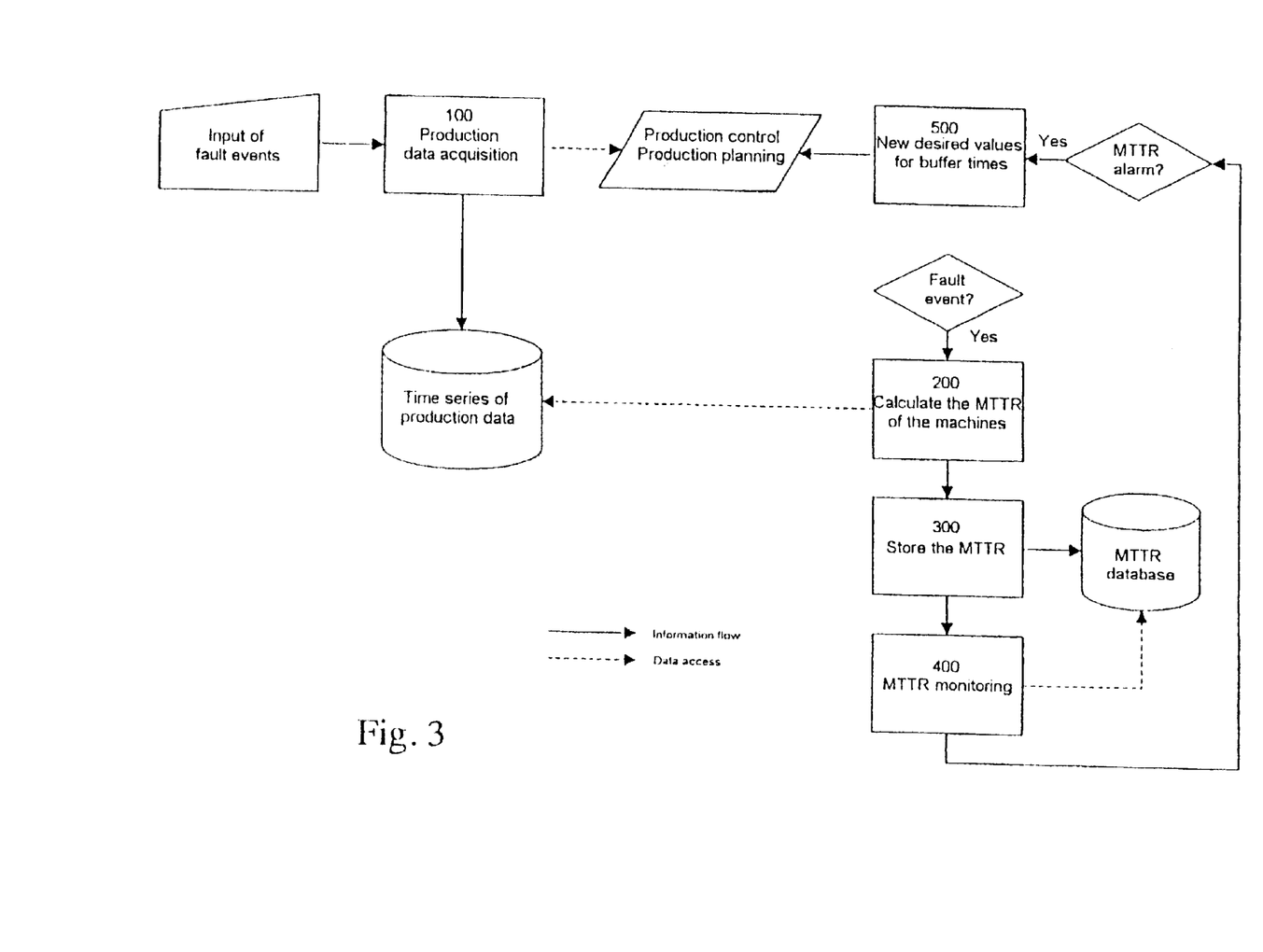
FIG. 3 is a flowchart showing the operation of the system.

FIG. 3 shows the way in which the system illustrated in FIG. 2 operates. In this case, in a step 100, the production data acquisition device 21 registers and stores the stoppage times of the machines needed for the optimization, including fault event information, as time series in the production database 31. In step 200, the MTTR calculator 22 calculates the MTTR characteristic values. The MTTR is given by the duration of the stoppages in the life cycle of a machine. The information relating to this resides in the production database 31. If a fault event occurs, the MTTR is calculated anew.

In step 300, the MTTR is stored in the MTTR database 32. For each machine, the current MTTR characteristic value is stored. It is also possible to store the changes in the MTTR during the entire operating period in the MTTR database 32 as well for the purpose of subsequent analysis.

In step 400, an observation is made to see whether the MTTR changes significantly over the course of time. A significance is detected (MTTA alarm) if a predefined delta threshold is exceeded.

Figure 5:
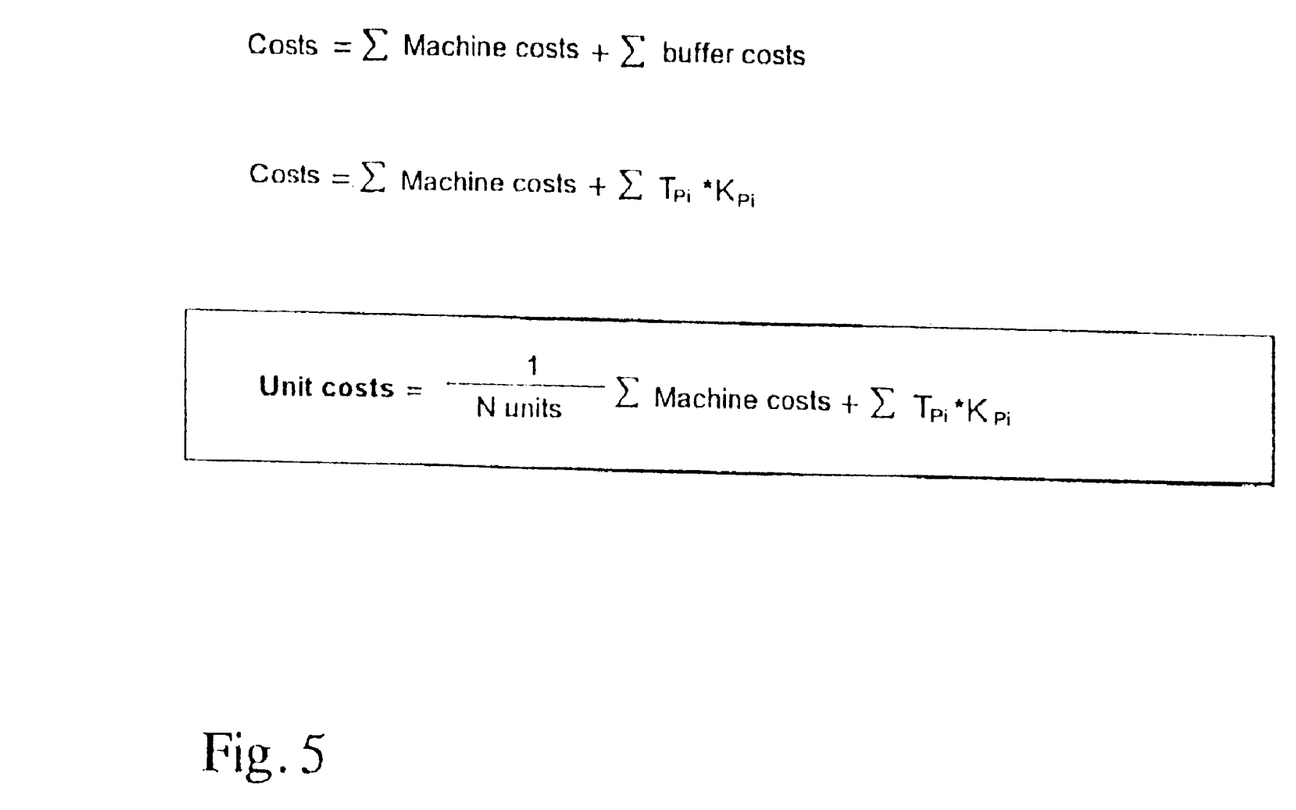
FIG. 5 is an equation of an assessment model.

In step 500, the respective new buffer time $T_{Pi}$ is calculated by the $T_P$ calculator 23 and predefined as a desired value in the desired-value memory 31. In order to determine the optimum buffer time, different assessment models can be used. If, for example, the production costs are influenced solely by the stoppage of the production chain, then the buffer times are selected in such a way that the machine stoppage times are compensated for. This means that the optimum buffer time results directly from the MTTR of the machine upstream of the respective buffer. FIG. 5 shows, by way of example, an assessment model that, in addition, takes account of the costs arising from the buffer.

Figure 4:
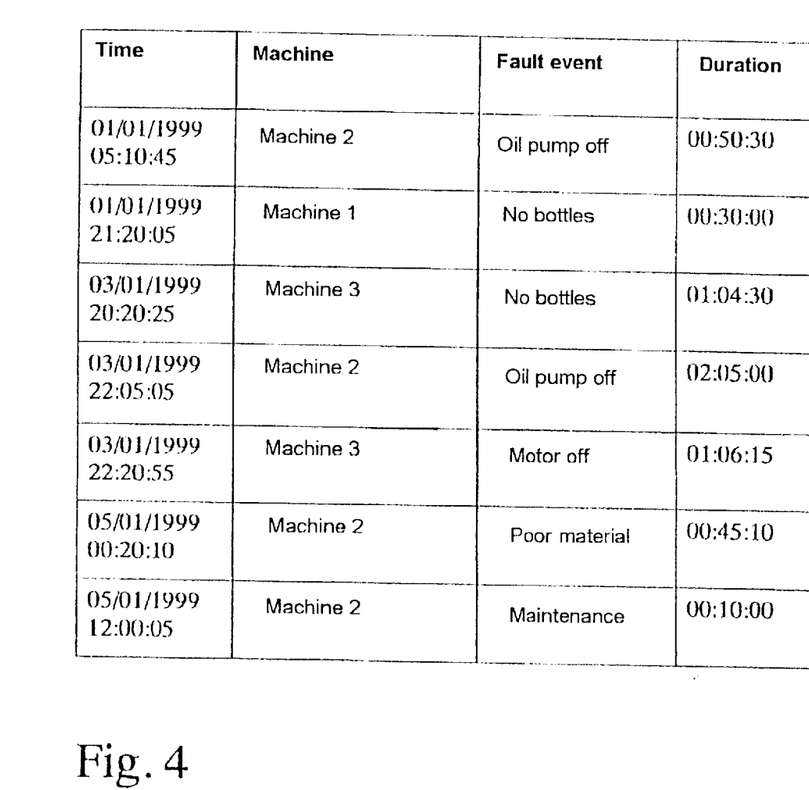
FIG. 4 is a table showing fault event data.

FIG. 4 shows, by way of example, fault event data, in each case, start time, machine, fault event, and duration being listed. The fault event data can either be derived automatically by the production data acquisition system 21, or the machine operator inputs the data via the data input 11.

FIG. 5 shows an assessment model by way of example. The assessment is performed using the production unit costs.

In the example, the production unit costs are influenced by machine coats, buffer costs and the product quantity n. In the example, the buffer costs rise with the buffer time $T_P$, given a constant buffer cost factor $K_P$.

We claim:

1. A method of controlling a discrete production process utilizing a series of production steps to process a product, each of the steps using a respective machine to produce a respective intermediate product, respective buffer times being defined during which at least one of a number of machines is able to continue to operate throughout a failure of one of the machines of a preceding production step by processing a stock of intermediate products corresponding to a respective buffer time and stored the intermediate products in a buffer during production; the method which comprises:

acquiring production data for each of the machines;

cyclically calculating statistically averaged repair times with a mean-time-to-repair (MTTR) calculator from the production data;

calculating desired buffer times with a buffer-time $(T_P)$ calculator from the statistically averaged repair times;

feeding the desired buffer times to a device for controlling the discrete production process.

2. In a production system for processing products having a desired-value memory and a series of production stations, each of the production stations having a buffer, a respective machine performing a respective step to produce a respective intermediate product and having a respective buffer time stored in the desired-value memory, at least one of the machines continuing to operate throughout a failure of one of the machines of a preceding production step by processing a stock of intermediate products corresponding to the associated buffer time and stored in the buffer during production; a data processing device automatically optimizing the buffer times, comprising:

a data server storing data selected from the group consisting of production data and fault event data;

a production database;

a mean-time-to-repair (MTTR) database;

a production data acquisition device connected to said data server and said production database, accessing the data in said data server, having a data input for receiving additional fault event data, registering stoppage times of the machines, and storing the stoppage times of the machines in said production database;

an MTTR calculator connected to said production database and said MTTR database, accessing said production database, calculating MTTR characteristic values from the stoppage times, and storing the MTTR characteristic values in said MTTR database; and a buffer-time $(T_P)$ calculator connected to said MTTR database and the desired-value memory, accessing said MTTR database, calculating the buffer times from the MTTR characteristic values using an assessment model, and storing the buffer times in said desired-value memory.

3. A production system for processing products, comprising:

a buffer;

a desired-value memory;

a series of production stations, each of said production stations having a respective machine performing a respective step to produce a respective intermediate product and having a respective buffer time stored in said desired-value memory, at least one of said machines continuing to operate throughout a failure of one of the machines of a preceding production step by processing a stock of intermediate products corresponding to an associated buffer time and stored in said buffer during production; and a data processing device automatically optimizing the buffer times, including:
  a data server storing data selected from the group consisting of production data and fault event data;
  a production database;
  a mean-time-to-repair (MTTR) database;
  a production data acquisition device connected to said data server and said production database, accessing the data in said data server, having a data input for receiving additional fault event data, registering stoppage times of said machines, and storing the stoppage times of said machines in said production database;
  a mean-time-to-repair (MTTR) calculator connected to said production database and said MTTR database, accessing said production database, calculating MTTR characteristic values from the stoppage times, and storing the MTTR characteristic values in said MTTR database; and
  a buffer-time ($T_P$) calculator connection to said MTTR database and said desired-value memory, accessing said MTTR database, calculating the buffer times from the MTTR characteristic values using an assessment model, and storing the buffer times in said desired-value memory.

* * * * *

UNITED STATES PATENT AND TRADEMARK OFFICE
CERTIFICATE OF CORRECTION

PATENT NO. : 6,662,064 B2 Page 1 of 1
APPLICATION NO. : 10/262147
DATED : December 9, 2003
INVENTOR(S) : Gerhard Vollmar et al.

It is certified that error appears in the above-identified patent and that said Letters Patent is hereby corrected as shown below:

Column 1, between the title and the subheading "BACKGROUND OF THE INVENTION" the following paragraph is inserted:

--CROSS-REFERENCE TO RELATED APPLICATION

This application is a continuing application, under 35 U.S.C. §120, of international application PCT/EP/00/02928, filed April 1, 2000, which designated the United States.--

Signed and Sealed this

Eighteenth Day of August, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 6,662,064 B2 |
| APPLICATION NO. | : 10/262147 |
| DATED | : December 9, 2003 |
| INVENTOR(S) | : Gerhard Vollmar et al. |

It is certified that error appears in the above-identified patent and that said Letters Patent is hereby corrected as shown below:

This certificate supersedes the Certificate of Correction issued August 18, 2009. The certificate should be vacated since petition under 37 CFR 1.78(a)(3) was not acted on at the time the Certificate of Correction was issued inserting Cross-Reference to Related Application. The petition was dismissed by office of petitions September 18, 2009 and therefore the Certificate of Correction should not have been issued. The applicant filed a second petition, filed November 25, 2009, which has been granted by the office of petitions and the Certificate of Correction should read as follows:

Column 1, between title and the first subheading, insert:

--Cross-Reference to Related Application:

This application is a continuation under 35 U. S. C. § 120 of international application PCT/EP00/02928, filed April 1, 2000, which designated the United States.--

Signed and Sealed this

Eighteenth Day of May, 2010

David J. Kappos
*Director of the United States Patent and Trademark Office*